H. PETIN.
MACHINE FOR DUSTING TIN PLATES OR OTHER METAL SHEETS.
APPLICATION FILED JUNE 3, 1911.
1,034,830.
Patented Aug. 6, 1912.
2 SHEETS—SHEET 1.
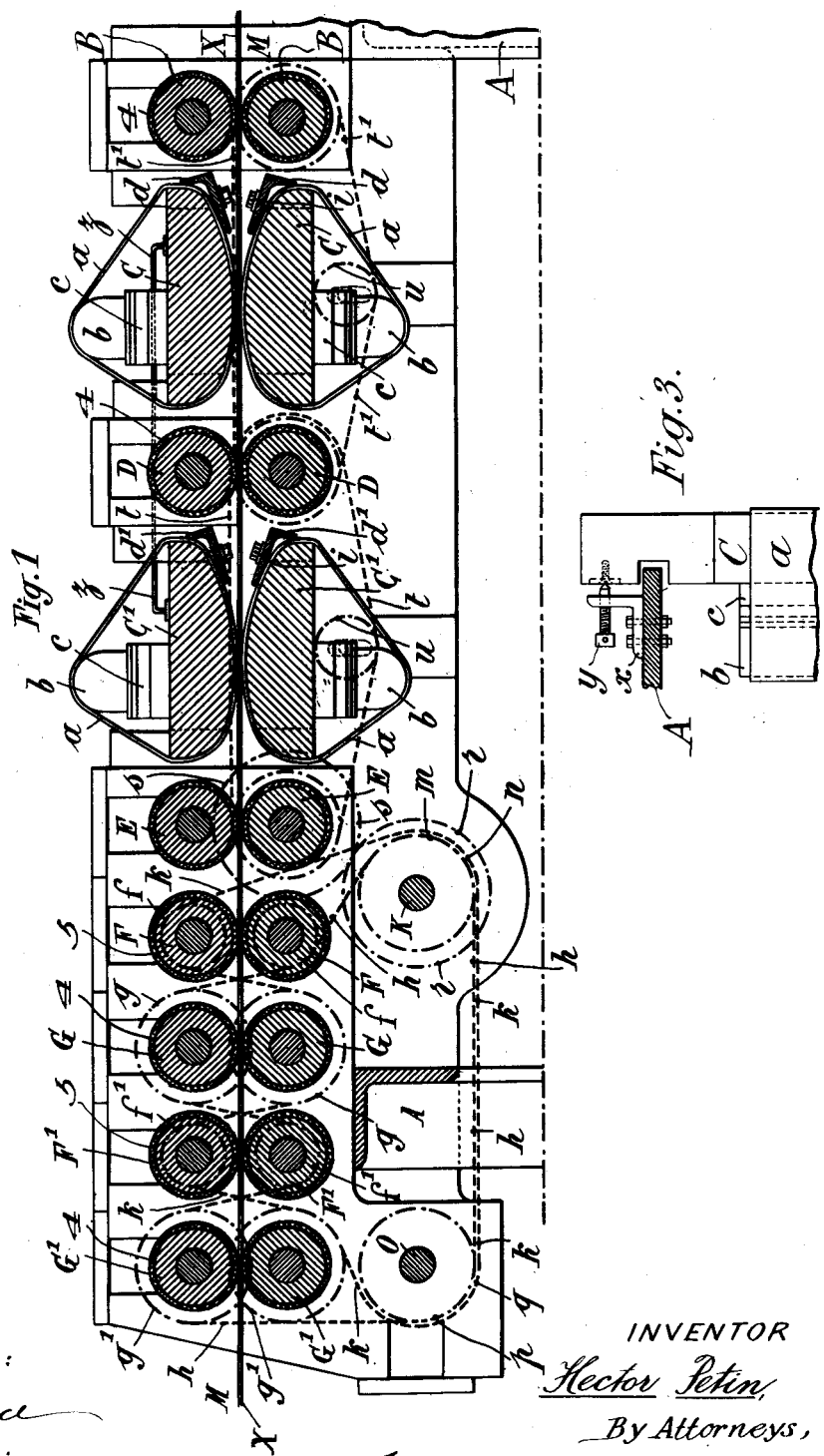

H. PETIN.
MACHINE FOR DUSTING TIN PLATES OR OTHER METAL SHEETS.
APPLICATION FILED JUNE 3, 1911.
1,034,830.
Patented Aug. 6, 1912.
2 SHEETS—SHEET 2.
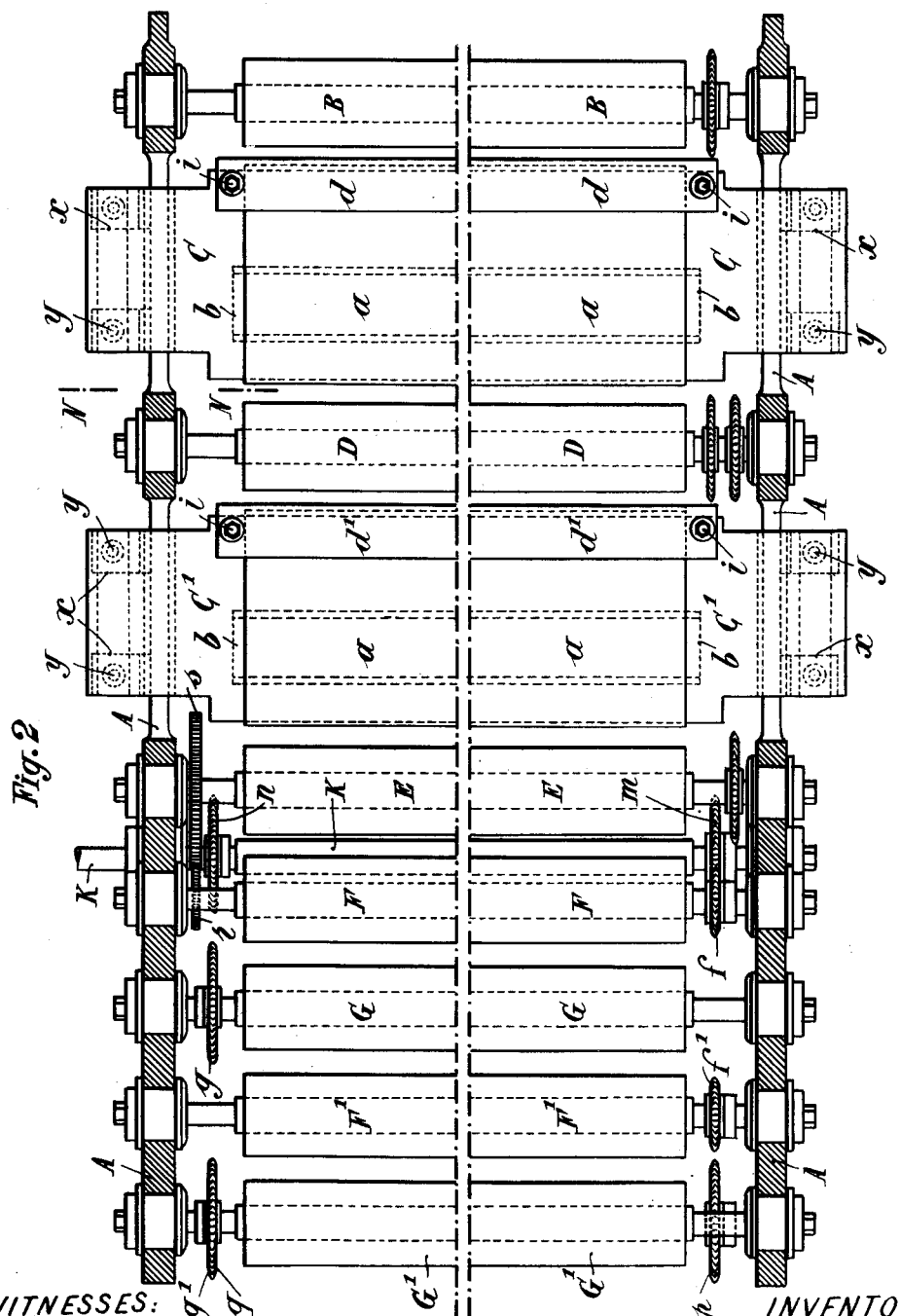

UNITED STATES PATENT OFFICE.

HECTOR PETIN, OF PARIS, FRANCE, ASSIGNOR TO SOCIETE DITE ETABLISSEMENTS J. J. CARNAUD ET FORGES DE BASSE-INDRE, OF PARIS, FRANCE.

MACHINE FOR DUSTING TIN PLATES OR OTHER METAL SHEETS.

1,034,830. Specification of Letters Patent. Patented Aug. 6, 1912.

Application filed June 3, 1911. Serial No. 631,164.

*To all whom it may concern:*

Be it known that I, HECTOR PETIN, a citizen of the Republic of France, residing in Paris, France, have invented certain new and useful Improvements in Machines for Dusting Tin Plates or other Metal Sheets, of which the following is a specification.

When tin plates are submitted to a scouring operation, by being passed through gypsum or other scouring material, they become covered with powder, and it is essential that before they are sold they be wiped and completely cleansed.

The machine, which constitutes this invention, has been designed for carrying out the cleansing operation as above referred to.

The machine comprises a number of conveying and wiping parts which operate on the metal sheets as they travel along in one horizontal plane. During the cleansing operation the tin plates are first of all caused to pass for a preliminary cleansing between wiping cushions arranged in the front portion of the machine, then for a final cleansing they pass through successive pairs of rollers, some of which serve as conveyers others as wipers or dusters, which effect the cleansing operations.

The whole arrangement of the machine, the disposition of the wiping cushions, of the cylindrical conveyers and the final dusting members as also the manner of operating the same, will be understood from the following description and accompanying drawings.

In the drawings Figure 1 is a longitudinal section of the machine; Fig. 2 is a sectional plan at the level of the horizontal line M M in Fig. 1, along which line the tin plates travel throughout the length of the machine, and Fig. 3 is a section on the line N N in Fig. 2.

The frame of the machine is constituted by two side plates A supported on pedestals; these plates carry the bearings of the spindles of a number of horizontal rollers which have various functions.

At the front end of the machine, where the tin plates to be cleaned are fed in, that is at the right hand in Fig. 1, two contacting conveying rollers B B feed the plates between two wiping cushions C C; two other conveying rollers D D subsequently conduct the plates on and between two superposed cushions $C^1 C^1$, beyond which are two other conveying rollers E E. This front part of the machine comprises the members which effect the preliminary wiping. The rear part of the machine is for the final wiping and polishing of the plates.

The rear part of the machine comprises a front pair of finishing dusting or wiping rollers F F, a pair of conveying rollers G G, a second pair of wiping rollers $F^1 F^1$ and lastly a second or rear pair of conveyers $G^1 G^1$. If desired the number of couples of conveying and wiping rollers may be increased.

Each of the cushions C, $C^1$ has a body portion of wood and of a suitable shape to allow of an easy entry and exit for the metal sheets; over the wood is stretched a cove ring of wool on the exterior surface of which is applied swan-skin adapted to wipe the metal. This covering with the swan-skin applied is indicated by $a$ in Fig. 1, it forms an endless band which passes over a rounded piece of wood $b$, wooden wedges $c$ being employed to impart any desired tension to the band $a$. This arrangement allows of the length of the endless band being successively used as the wedges can be loosened and the band shifted with respect to the block C.

Opposite each of the cushions C, $C^1$, at the end where the metal sheets enter between them, a metal guide $d$ or $d^1$ is fixed as it were cornerwise, by a screw or other means, to the wooden cushions. These metal guides facilitate the entry of the metal sheets between the cushions, by preventing the edges of a sheet striking directly against these cushions thereby cutting and rapidly spoiling them and by obviating the buckling of the sheets by knocking against the swan-skin. These guides, which may be of wrought or cast iron, hold the cushions fast and approach very close to the plane tangent to the rollers B B and D D.

The lower cushions C $C^1$ are supported by the frame A, which for that purpose (see Fig. 3) carries on each of its outer faces an angle piece $x$ through which pass two adjusting screws $y$ and on the screws $y$ rests the bottom of the wooden portion of the cushion C, which bottom may be protected when necessary by a band of metal. The upper cushions repose on the lower ones by reason of their weight only. The pressure of the upper cushions on the lower may be varied by using additional weights, such as metal plates attached to the wooden parts C C¹, in which case all or some of the wooden wedges c may be removed. In this way the friction exerted by the swan-skin on the metal sheets may be varied according to the thickness of the tin plates. By reason of the upper cushions resting simply on the lower cushions, it is very easy for the operator, who superintends the working of the machine, to raise these cushions, separately or together, the two upper cushions being for this purpose connected at their two ends by flat iron bands $z$; the two upper cushions while resting on one side on the frame can be lifted up from the other side and both the upper and lower cushions may be then struck with a brush to free them of the dust with which they are charged.

The spindles of the dusting and conveying rollers F G, F¹ G¹ carry toothed wheels $f, g, f^1 g^1$ over which pass two chains $h$ and $k$, one on one side of the machine the other on the other side; these two chains pass respectively over toothed wheels $m$ $n$ on the driving shaft K and also over the return pinions $p$ $q$ carried by the shaft O. The chain $h$ which passes over wheel $m$ traverses first the pinion $f$ of a lower dusting roller, then the wheel $g$ of an upper conveying roller, it descends around pinion $f^1$ of a lower dusting roller, rises again around the pinion of an upper conveying roller, then passes around sprocket wheel $p$ and returns to pinion $m$. Chain $k$ starting from pinion $n$ passes to pinion $f$ of an upper dusting roller, descends around the pinion of a lower conveyer, rises again around an upper dusting roller, redescends toward the pinion of a lower conveying roller then turns to pass around wheel $q$ and returns to pinion $n$. From what has just been said it will be seen that the directions of the two chains $h$ and $k$ are crossed with respect to one another in passing on exterior side of the pinions which they drive, so that the rollers in the several pairs of dusting and conveying rollers are pressed toward each other by the simple tension in those chains, which insures a regular feeding and a perfect wiping by the rollers of the metal sheets. The pinions mounted on the axles of the dusting rollers F F¹ are of a diameter perceptibly smaller than that of the pinions mounted on the axles of the conveying rollers G G¹; consequently the dusting rollers turn perceptibly quicker than the conveying rollers, which greatly helps the dusting process.

The conveying rollers G G, G¹ G¹ are covered exteriorly with swan-skin, felt or other suitable material 4 that will not injure the tin; the dusting rollers F F, F¹ F¹ are covered, for preference, with sheep skin 5 which assures a more effective wiping.

The operating axle K carries a toothed wheel $r$ meshing with a wheel $s$ carried by the spindle of the lower conveying roller E. An endless chain $t$ couples a pinion on the spindle of the lower conveyer roller E and a pinion on the spindle of the lower conveyer roller D; another chain $t^1$ couples another pinion carried on the spindle of the same lower roller D and a pinion carried by the spindle of the front lower conveying roller B. These two chains $t$ $t^1$ are on the same side of the machine. Each of them passes over a tension pulley $u$, the axes of which can be displaced in vertical slots so that the tension of the chains may be adjusted. The upper rollers B, D and E are operated simply by friction with each of the respective lower rollers.

The operation of this machine is effected in the following manner: The tin plates X that are to be cleaned are placed first of all between the rollers B B, they then pass between the front pair of cushions C C, the rollers D D, the second pair of cushions C¹ C¹ and the rollers E E; they subsequently pass between the several pairs of dusting and conveying rollers F G, F¹ G¹. These plates in passing between the cushions C C¹, lose most of the powdery matter and other impurities with which they may be covered; any powder and impurities remaining is wiped off by the dusting rollers F F¹ which are as stated above preferably covered with sheep skin. These rollers complete the operation by wiping the more or less depressed portions on the surfaces of the metal sheets which depressions may have escaped the action of the cushions C C¹.

Having now particularly described and ascertained the nature of my said invention and in what manner the same is to be performed, I declare that what I claim is:

1. A machine for dusting sheets of tin plate or the like comprising a pair of dusting cushions and pairs of dusting and finishing rollers, arranged in succession, and means for feeding a plate through said rollers and between said cushions.

2. In a machine for dusting sheets of tin plate or the like, the combination of upper and lower wiping cushions arranged in front of the machine, said lower cushion being adjustably supported with relation to the frame of the machine, and the upper cushion resting upon the upper side of the plate.

3. In a machine for dusting sheets of tin plate or the like, the combination of upper and lower wiping cushions having a relatively soft covering upon their wiping faces, and guides in advance of said cushions inclined toward each other to guide the plate between the cushions.

4. In a machine for dusting sheets of tin plate or the like, the combination of a series of pairs of dusting and finishing rollers, a series of pairs of conveying rollers, the dusting and conveying rollers being alternatively arranged and the rollers in each pair movable toward one another, and chains one on each side of the machine for driving said rollers, each chain engaging successive pairs of rollers by passing over the outer side of the upper roller in one pair and over the outer side of the lower roller in the next pair, each chain engaging a roller in each pair opposite the roller engaged by the chain on the other side, whereby tension upon said chains may be transmitted vertically to said rollers.

5. A machine for dusting sheets of tin plate or the like comprising a pair of dusting cushions and pairs of dusting and finishing rollers, and pairs of feed rollers, said dusting and said feed rollers being covered with a soft material, said pairs of dusting rollers and pairs of feed rollers being alternately arranged.

6. A machine for dusting sheets of tin or the like comprising a pair of feed rollers B, a pair of dusting cushions C, a pair of feed rollers D, a second pair of dusting cushions $C^1$, a pair of feed rollers E, and successive alternative pairs of dusting and finishing rollers and feed rollers F, G, $F^1$, $G^1$, substantially as described.

In witness whereof, I have hereunto signed my name in the presence of two subscribing witnesses.

HECTOR PETIN.

Witnesses:
H. C. COXE,
CHARLES MARDELET.